US009656895B2

(12) United States Patent
Grélot et al.

(10) Patent No.: US 9,656,895 B2
(45) Date of Patent: May 23, 2017

(54) METHOD FOR TREATING A WASTE STREAM USING A BIOREACTOR AND A MEMBRANE FILTER

(71) Applicant: Veolia Water Solutions & Technologies Support, Saint Maurice (FR)

(72) Inventors: Aurélie Grélot, Saint Maurice (FR); Abraham Izaak Versprille, Saint Maurice (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 177 days.

(21) Appl. No.: 14/386,772

(22) PCT Filed: Mar. 20, 2013

(86) PCT No.: PCT/EP2013/055755
§ 371 (c)(1),
(2) Date: Sep. 19, 2014

(87) PCT Pub. No.: WO2013/139823
PCT Pub. Date: Sep. 26, 2013

(65) Prior Publication Data
US 2015/0048024 A1 Feb. 19, 2015

(30) Foreign Application Priority Data
Mar. 20, 2012 (EP) .................................... 12160273

(51) Int. Cl.
*C02F 9/00* (2006.01)
*C02F 3/28* (2006.01)
(Continued)

(52) U.S. Cl.
CPC .............. *C02F 9/00* (2013.01); *B01D 61/145* (2013.01); *B01D 61/16* (2013.01); *C02F 1/444* (2013.01);
(Continued)

(58) Field of Classification Search
CPC .......... C02F 3/2853; C02F 1/444; C02F 1/52; C02F 3/28; C02F 3/2866; C02F 11/006;
(Continued)

(56) References Cited

U.S. PATENT DOCUMENTS 4,626,354 A 12/1986 Hoffman et al.
7,485,228 B2 2/2009 Herding et al.
2007/0209999 A1 9/2007 Smith et al.

FOREIGN PATENT DOCUMENTS

DE 102004030482 8/2005
JP 2002361292 12/2002
(Continued)

OTHER PUBLICATIONS

Machine-generated English translation of DE 10 2004 030482, generated on May 18, 2016.*

(Continued)

*Primary Examiner* — Fred Prince
(74) *Attorney, Agent, or Firm* — Morrison & Foerster LLP

(57) ABSTRACT

Method for treating a fluid aqueous waste stream comprising a biodegradable organic substance, comprising—feeding said stream into a bioreactor containing a fluid which contains biomass;—reacting the biodegradable organic substance with the biomass in the bioreactor under essentially anaerobic conditions;—taking a first flow from the bioreactor and using the first flow as a feed to a membrane filtration unit, in which said feed is subjected to filtration, thereby forming a permeate stream and a retentate stream;—return-
(Continued)

ing the retentate stream to the bioreactor;—taking a second flow from the bioreactor as feed to a sludge treatment unit, in which sludge treatment unit the second flow is separated into a third flow, having an increased organic substance content compared to the second flow, and a fourth flow, having a decreased organic substance content compared to the second flow.

21 Claims, 2 Drawing Sheets

(51) Int. Cl.
  *C02F 1/44* (2006.01)
  *C02F 11/04* (2006.01)
  *B01D 61/14* (2006.01)
  *B01D 61/16* (2006.01)
  *C02F 1/52* (2006.01)
  *C02F 11/00* (2006.01)
  *C02F 11/12* (2006.01)
  *C02F 11/14* (2006.01)

(52) U.S. Cl.
  CPC .............. *C02F 3/28* (2013.01); *C02F 3/2853* (2013.01); *C02F 3/2866* (2013.01); *B01D 2311/04* (2013.01); *B01D 2311/25* (2013.01); *B01D 2315/06* (2013.01); *C02F 1/52* (2013.01); *C02F 11/006* (2013.01); *C02F 11/04* (2013.01); *C02F 11/121* (2013.01); *C02F 11/14* (2013.01); *C02F 2203/004* (2013.01); *Y02E 50/343* (2013.01)

(58) Field of Classification Search
  CPC ......... C02F 11/04; C02F 11/121; C02F 11/14; C02F 2303/004; B01D 61/145; B01D 61/16; B01D 2311/04; B01D 2311/25; B01D 2315/06; Y02E 50/343
  USPC .......................... 210/603, 609, 631, 252, 259
  See application file for complete search history.

(56) References Cited

FOREIGN PATENT DOCUMENTS

| | | |
|---|---|---|
| RU | 2 377 191 | 12/2009 |
| WO | WO-2005/058764 | 6/2005 |
| WO | WO-2007/076953 | 7/2007 |
| WO | WO-2010/147964 | 12/2010 |
| WO | WO-2011/130392 | 10/2011 |

OTHER PUBLICATIONS

International Search Report for PCT/EP2013/055755, mailed Jul. 3, 2013, 5 pages.

* cited by examiner

METHOD FOR TREATING A WASTE STREAM USING A BIOREACTOR AND A MEMBRANE FILTER

CROSS-REFERENCE TO RELATED APPLICATIONS

This application is the national phase of PCT application PCT/EP2013/055755 having an international filing date of 20 Mar. 2013, which claims benefit of European patent application No. 12160273.4 filed 20 Mar. 2012. The contents of the above patent applications are incorporated by reference herein in their entirety.

The invention relates to a method for treating a fluid aqueous waste stream and to an installation suitable for treating a fluid aqueous waste stream.

Biological treatment of waste streams uses active biomass (bacteria) to degrade biodegradable pollutants (biodegradable organic substances) in the waste stream, for instance a waste water stream.

For so-called anaerobic treatment (without oxygen) a consortia of anaerobic bacteria, which are generally known in the art, convert pollutants substantially to methane and carbon dioxide, which will end up in the biogas. Under anaerobic conditions, the production of surplus sludge (new biomass (bacteria) as a result of bacterial growth) is generally relatively low, because typically only a small part of the biodegradable substance in the waste is used by the bacteria for bacterial growth.

Suitably, the conversion of biodegradable organic substances is carried out in a bioreactor containing an aqueous suspension (slurry or sludge) comprising biomass, un-reacted solids from the waste stream and inorganic reaction products.

Such biomass, un-reacted solids and particulate inorganic reaction products may be separated from the fluid taken from the bioreactor by filtration, for instance by membrane filtration. Membranes can be used in combination with biological anaerobic treatment of waste streams to improve quality of the effluent from the waste water treatment process, reduce plant footprint and increase organic load. Biological reactors coupled to a membrane separation unit are commonly referred to as membrane bioreactors.

However, the organic loading rate (mass of COD that is digested per reactor volume per time unit, e.g. kg COD/m$^3$ day) of membrane bioreactors is usually limited by the operation and filtering capacity of the membrane units, in particular because of the applicable fluxes and the intensity of membrane fouling. If the biological process is operated at a too high sludge (biomass) concentration, this leads to high concentration polarisation effects at the membrane surface which leads to higher cake layer resistance and therefore to membrane flux reduction or high operating pressure. In addition, in order to operate at a high solids concentration, higher shear stress at the membrane surface must be applied which leads to higher operating costs.

DE 10 2004 030 482 A1 relates to a method for fermenting waste, in particular liquid manure, wherein a stream taken from a bioreactor is subjected to a solid-liquid pre-separation step, wherein the suspended solid content of the stream is reduced. Only thereafter, the remainder of the liquid stream is subjected to ultrafiltration and reverse osmosis. The removed solids are returned to the bioreactor.

WO 2005/058764 relates to an apparatus for anaerobic digestion of an organic waste liquid. The apparatus contains a concentrator (2) for concentrating digested sludge, which is returned to the digestion tank. The concentrator (2) for concentrating the digested sludge may be any one as long as it can separate the digested sludge into solids and liquid to concentrate the sludge. In a specific embodiment (FIG. 2), the apparatus also contains a centrifugal thickening machine (7) for treating digested sludge from the digestion tank. In this machine the mineral constituent in a digested sludge is condensed preferentially. Hereby the mineral constituent can be preferentially discharged out of the system, thereby preventing accumulation of mineral solids. In particular, since WO 2005/058764 refers to using a centrifugal technique and mentions that the mineral content (i.e. inorganic content) is preferentially condensed and discharged, it is apparent that FIG. 2 of this document does not disclose an apparatus for use in a method wherein a feed is taken from the digestion tank and wherein that feed is separated into a flow, having a higher organic substance content than said feed and another flow, having a lower organic substance content than the second flow, wherein the latter is completely or partly fed into the digestion tank.

In WO 2011/13092 A1, it is proposed to reduce fouling of the membrane by taking effluent from the middle section of a stratified bioreactor wherein the solids concentration is relatively low compared to the solids concentration in the top section and in the bottom section. Thus, higher solids concentrations are maintained in the reactor while supplying a less concentrated stream (filter-feed) to the membrane separation unit. Over time this would enhance the highest possible membrane flux rate per unit of membrane system energy input. WO 2011/13092 A1 also makes use of a separator, such as a cyclone wherein a stream from the bioreactor is separated into a heavier solids stream and a lighter solids stream containing biomass. The lighter solids stream containing biomass (organic substance) is at least partially returned to the bioreactor. It is thus apparent that this stream has a higher organic substance content than the stream fed into the separator.

Although the above cited prior art, in particular WO 2011/13092, may offer an advantage over more conventional methods of operating a membrane bioreactor, e.g. in that fouling tendency is reduced, in that less energy is required for operating the filtration unit and/or in that the number of cleaning cycles of the membrane is reduced, there is a continued need for alternative or improved methods and installations for treating waste streams in a membrane bioreactor.

In particular, there is a desire for a method which is advantageous with respect to one or more of the following aspects: reduced overall-energy consumption of the membrane bioreactor, reducing fouling of the membrane, prolonging life time of the membrane, increasing availability of the membrane bioreactor (time between to stops to clean or replace parts), increased flux over the membrane, improved bioreactor performance, increased treatment capacity, increased treatment efficiency, reduced overall capital expenditure (Capex), reduced overall operational expenditure (Opex).

SUMMARY OF THE INVENTION

It is an object of the present invention to provide such an alternative method or installation, in particular a method or installation offering any of the advantages mentioned herein.

The inventors have realised that certain solids-related parameters are very relevant.

In particular the inventors have realised that a specific fraction of the organic substance is relevant with respect to causing or contributing to problems when carrying out a method for treating a waste stream comprising organic substances, in particular with respect to causing or contributing to problems during membrane filtration.

More in particular the inventors realised that a relatively low abundance of relatively small organic particles, such as colloidals, and soluble organic molecules in the filter-feed, in absolute terms and/or relative to the total solids concentration in the filter-feed also offers an advantage.

The inventors have in particular realised that this can be achieved in a number of alternative ways which each comprise leading a first flow of fluid, which has been treated in a bioreactor, to the membrane filtration unit and leading a second flow of fluid which is being treated or has been treated in the bioreactor into a sludge treatment unit wherein it is separated into at least two streams (a third flow and a fourth flow). The third flow is typically a concentrated sludge, having an increased solids content compared to the fluid of the second flow; the fourth flow is usually an aqueous liquid, and typically has a reduced content of solids, in particular also a reduced content of relatively small organic particles and soluble organic compounds. The inventors have realised that by returning this fourth flow (partly or completely) to the bioreactor or by leading this fourth flow (partly or completely) into the filtration unit (typically after mixing with the first flow) it is possible to improve a filterability characteristic of the filter-feed and/or the fluid in the bioreactor such that one or more problems such as indicated above are overcome or at least alleviated. In particular, they found that thus a filter-feed is obtained that is easier to filter.

Accordingly, the present invention relates to a method for treating a fluid aqueous waste stream comprising a biodegradable organic substance, comprising
- feeding the aqueous waste stream into a bioreactor containing a fluid which contains biomass;
- reacting the biodegradable organic substance with the biomass in the bioreactor under essentially anaerobic conditions;
- taking a first flow of fluid from the bioreactor and using the first flow as a feed to a membrane filtration unit (filter feed), in which said feed is subjected to filtration, thereby forming a permeate stream and a retentate stream;
- returning the retentate stream completely or partly to the bioreactor;
- taking a second flow of fluid from the bioreactor as feed to a sludge treatment unit, which sludge treatment unit may be positioned outside the bioreactor or integrated in the bioreactor, in which sludge treatment unit the second flow of fluid is treated and separated into a third flow—having an increased organic substance content compared to the second flow—, and a fourth flow—having a decreased organic substance content compared to the second flow—are formed;
- using the fourth flow completely or partly for the feed of the membrane filtration unit. The (part of the) fourth flow that is used for the filter feed is typically mixed with the first flow that is to be fed to the membrane filtration unit.

Further, the present invention relates to a method for treating a fluid aqueous waste stream comprising a biodegradable organic substance, comprising
- feeding the aqueous waste stream into a bioreactor containing a fluid which contains biomass;
- reacting the biodegradable organic substance with the biomass in the bioreactor under essentially anaerobic conditions;
- taking a first flow of fluid from the bioreactor and using the first flow for a feed to a membrane filtration unit (filter feed), in which said feed is subjected to filtration, thereby forming a permeate stream and a retentate stream;
- returning the retentate stream completely or partly to the bioreactor;
- taking a second flow of fluid from the bioreactor as feed to a sludge treatment unit, which sludge treatment unit may be positioned outside the bioreactor or integrated in the bioreactor, in which sludge treatment unit the second flow of fluid is treated and separated into a third flow—having an increased organic substance content compared to the second flow—and a fourth flow—having a decreased organic substance content compared to the second flow—is formed; and
- feeding the fourth flow completely or partly to the bioreactor.

Further, the present invention relates to an installation suitable for carrying out a method as described above, comprising a bioreactor (5); a sludge treatment unit (6) suitable for treating a fluid feed stream (second flow) from the bioreactor and forming a stream (third flow) having an increased organic substance content compared to the feed stream and a stream (fourth flow) having a decreased organic substance content compared to the feed stream, and a membrane filtration unit (7),
- the bioreactor (5) comprising an inlet (8, 8a) for a fluid waste stream, an outlet (12, 12a, 12b) for a fluid flow and an outlet (11) for a gas;
- the sludge treatment unit (6) comprising an inlet (13) for fluid originating from the bioreactor (5), which inlet (13) is connected with the outlet for a fluid (12, 12a, 12b) of the bioreactor via a conduit (2) in a manner allowing for transporting fluid from the bioreactor (5) to the sludge treatment unit (6);
- the sludge treatment unit (6)) comprising an outlet (14) for the fourth flow, and an outlet (15) for the third flow;
- the membrane filter unit (7) comprising an inlet (16) for a fluid which inlet (16) is connected with the outlet (12, 12a) in a manner allowing for fluid from the bioreactor via a conduit (1) for transporting fluid from the bioreactor (5) to the filter unit (7);
- the membrane filtration unit (7) comprising an outlet (18) for permeate and an outlet (17) for retentate, wherein the outlet (17) for retentate of the filtration unit (7) is connected to a recycle conduit (9) in a manner allowing for returning the retentate from filtration unit (7) to the bioreactor (5);
- the outlet (14) for the fourth flow of the sludge treatment unit being connected with a conduit (4, 4a) in a manner allowing for introducing the fourth flow, preferably after mixing with fluid taken from the bioreactor via the outlet for fluid (12, 12a), via inlet (16) as filter feed (FF) into the filtration unit and/or the outlet (14) for the fourth flow of the sludge treatment unit being connected with a conduit (4, 4b) in a manner allowing for recycling the fourth flow to the bioreactor via the same inlet (8) or a separate inlet (8b) into the bioreactor. Usually, an installation according to the invention a sludge outlet (3b, 103) to extract sludge. This is advantageous in order to maintain a desired (constant) biomass concentration in the bioreactor or another part of the installation.

In a method of the invention, the permeate from the membrane filtration unit is usually discarded as effluent or may be subjected to a further treatment, downstream of the filtration unit, in a manner known per se. In a specific embodiment, methane is recovered from the effluent. This reduces discharge of methane, a greenhouse gas, into the atmosphere. This may also be desired for reasons of safety. A suitable method to recover methane is described in PCT/NL2011/050840.

During the anaerobic conversion of organic substances (which may include biological substances such as carbohydrates, fats, proteins, but also synthetic chemicals), generally methane (biogas) is produced. The methane can be further treated in a manner known per se. E.g. it can be used as an energy source, optionally after purification.

Further, part of the organic substance may be converted into biomass (bacteria). The biomass formed during the method is usually referred to as surplus sludge. The third flow is usually totally or partly discharged. Herewith, undesired accumulation of particles, especially biomass, is avoided. Alternatively or in addition, a discharge may be provided directly from the bioreactor.

The discharged third flow or discharged fluid from the bioreactor may be subjected to a further treatment, downstream of the sludge treatment unit in a manner known per se. E.g. is may be de-watered prior to discarding it. In principle it is also possible to return part of the third flow to the bioreactor. In particular in case unacceptable accumulation of organic substance/biomass in the installation may be a problem, surplus sludge (containing organic substance/biomass) may be discharged from the bioreactor.

Advantageously, the invention provides one or more of the following advantages: reduced overall-energy consumption of the membrane bioreactor, reduced fouling of the membrane, prolonging life time of the membrane, increased availability of the membrane bioreactor (time between to stops to clean or replace parts), increased flux over the membrane, improved bioreactor performance, increased treatment capacity, increased treatment efficiency, reduced overall Capex, reduced overall Opex (with respect to energy, chemicals).

By carrying out the method according to the invention it is in particular possible to operate the membrane bioreactor at a satisfactory organic loading rate (kg $COD/m^3$ day), preferably an increased organic loading rate, while controlling the membrane fouling.

Further, the method may also contribute to avoiding accumulation or reducing the content of solids that are not degradable by the anaerobic bacteria, such as inorganic particles, compared to a method wherein no second flow is subjected to the treatment in the sludge treatment unit. In particular, a reduction of at least 2 wt. % wt., preferably by at least 10 wt. %, in particular by 20-90 wt %, more in particular by 30-50 wt. % is considered to be feasible.

The inventors in particular consider that in processes according to the prior art, feeding the membrane filtration unit with a feed that has a relatively high weight to weight ratio of relatively small particulate organic substance and soluble organic substance matter to total suspended solids (TSS) particles (which can be expressed in g COD/g TSS), may lead to an increase of the membrane fouling, unless special measures are taken, such as increasing chemical cleanings and backwash frequencies or operating at a higher cross-flow velocity (which will increase operating costs).

Further, the inventors consider that the measures taken in the prior art, at least in some circumstances may contribute to the formation of extra organic particles of a relatively small size—such as colloidal solids—and relatively large soluble organic molecules (such as soluble biopolymers, if present) (due to high stress and breakdown of larger particles and bacteria), whereby the advantageous effects of such measures may be reduced. A relatively high concentration of such organic particles and soluble organic molecules may lead to a reduced availability of the installation (for carrying out a method) according to the invention or even a reduced life-time of the membrane (due to penetration into the porous structure of the membrane where they may get stuck).

In particular, the inventors consider that the presence of organic soluble substances and colloidal substances having a size less than 20 µm may contribute to disadvantageous effects, such as membrane fouling.

It is contemplated that such disadvantageous effects can be avoided or at least reduced in a method according to the invention.

Further, it is considered that a method according to the invention, is advantageous in that the risk or extent of membrane clogging or scaling on the filter membrane, as may be caused at least in part by mineral particles that are present in the feed to the filter membrane (e.g. struvite).

DETAILED DESCRIPTION

Figure 1:
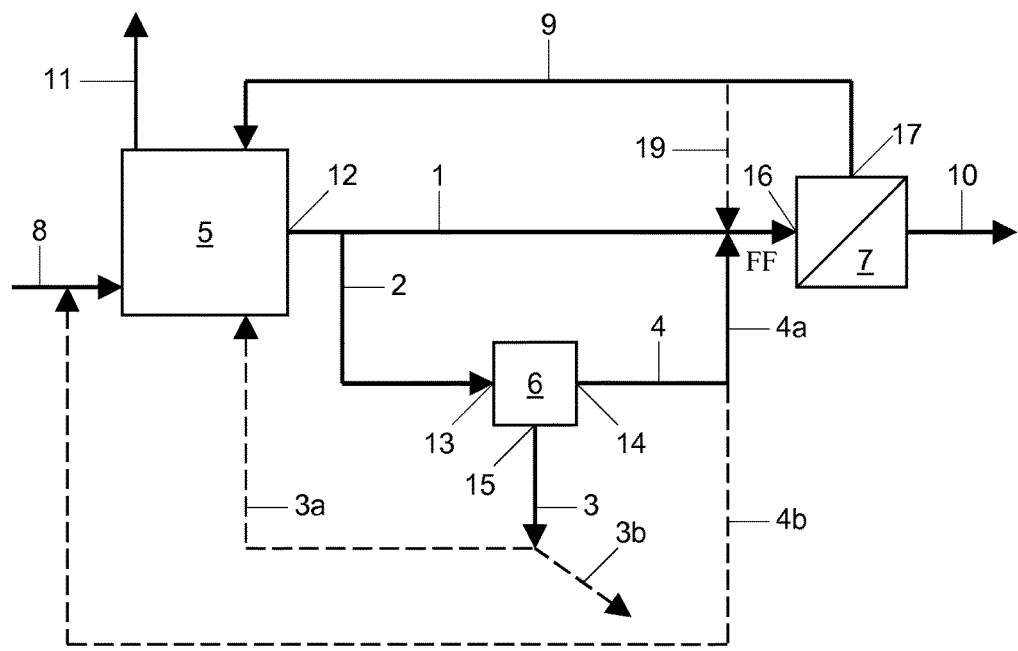
FIG. 1 is a schematic showing an installation for carrying out the method of the invention.

The term "or" as used herein is defined as "and/or" unless specified otherwise.

The term "a" or "an" as used herein is defined as "at least one" unless specified otherwise.

When referring to a noun (e.g. a compound, an additive, etc.) in the singular, the plural is meant to be included.

As used herein 'biodegradable organic substance' is organic substance that can be converted by biomass in the reactor under essentially anaerobic conditions, in particular into biomass or methane.

As used herein 'organic substance' is any organic substance that is chemically oxidisable, as can be determined by the Chemical Oxygen Demand (COD) test, as described in ISO 6060:1989. A content of organic substance is generally expressed in g COD, i.e. grams oxygen that is consumed for the oxidation of the organic substance.

The content (concentration) of an organic substance is the amount of the organic substances per volume unit, expressed as g COD/l, unless specified otherwise.

The 'total solids' in a fluid (TS) consists of the constituents of the fluid other than water. The fraction of organic substance in the total solids, may be determined by the COD test. In practice, the following 'burning test' is usually also suitable: drying a known amount of the fluid at 105° C. until constant weight and determining the weight of the dried specimen. The residual weight is the total solids (TS). The TS measurement may thus include inorganic substance in addition to organic substance. To distinguish the organic substance from the inorganic substance, the sample is burned at 550° C., the organic substances are burned and the sample residual consists of one or more inorganic substances. The burning test is usually a practical alternative to the COD test. The 'total suspended solids' in a fluid (TSS)

consists of the solid fraction of the fluid that is obtained by filtering a known weight or volume of the fluid using a 1.6 μm filter (dead end filtration), taking the retentate, washing the retentate with distilled water, drying the washed retentate, and determining the residual dry weight. The TSS may thus include inorganic substance in addition to organic substance. To distinguish the organic substance from the inorganic substance, the sample is burned at 550° C., all the organic substances are burned and the sample residual consist in inorganics. The burning test is usually a practical alternative to the COD test.

The average content of a substance in a defined volume (e.g. in a unit of the installation wherein the method is carried out, in particular the bioreactor), is the total amount of the substance divided by the defined volume, e.g. the average total solids content in the bioreactor is the total weight of solids divided by the volume of fluid in the bioreactor.

The term 'colloidals' is used herein for matter which remains in the fluid phase after centrifugation at 17500 G (usually particles smaller than 20 μm) and that does not pass through a 0.45 μm filter, when filtered.

The term 'soluble matter' or 'soluble substance' is used for matter other than water that passes through a 0.45 μm filter as part of the filtrate. The soluble organic content is determined by measuring the COD concentration of the filtrate through the 0.45 μm filter.

The term 'total particulate solids' or 'total particles' is used for all solids that do not fall under the definition of 'soluble substance', i.e. solids that have a particle size of at least 0.45 μm.

As used herein the 'filter feed' (FF in the Figures) is the fluid flow that is subjected to filtration in the membrane filtration unit. It usually comprises the first flow. Further, in an advantageous embodiment it comprises the fourth flow (or a part thereof), which is usually mixed with the first flow prior to filtration in an embodiment wherein fourth flow is used for the filter feed.

The waste stream to be treated can in principle be any aqueous waste stream that comprises an organic substance that is biodegradable under anaerobic conditions. In particular, the waste stream can be selected from the group of municipal waste water streams, industrial waste water streams, sewage streams, aqueous waste streams from fermentation processes (such as residual fermentation broth), aqueous slurries and aqueous sludges.

The bioreactor can be operated in a manner known per se. Usually, the average total suspended solids content (TSS) in the bioreactor, at least during a treatment in accordance with the invention, is at least 5 g/l, in particular 8-60 g/l, more in particular 8-45 g/l, more in particular 10-35 g/l. It is a specific advantage that a method according to the invention can be operated at a relatively high concentration of total solids, in particular at a relatively high concentration of total suspended solids, whilst maintaining one or more advantages such as mentioned above. Preferably the average TSS is at least 15 g/l, more in particular at least 20 g/l, at least 25 g/l or at least 30 g/l.

The bioreactor may in particular be a mixed reactor.

In a specific embodiment, the reactor is a reactor, typically a mixed reactor, with stratified fluid zones (regions), including an upper, intermediate and lower zone. Such reactor may for instance be based on the disclosure of PCT/US11/32293, of which the contents are incorporated by reference, in particular FIG. 1, and paragraphs [0020]-[0023]. From upper to intermediate to lower zone the solids content changes quantitatively (different TSS content) and/or qualitatively (difference in fraction of heavy/light solids, difference in fraction of coarse/fine solids). In particular, a first zone may have a relatively high concentration in heavy solids (high density solids), yet a relatively low concentration in light solids (low density solids), compared to a second zone. More in particular, the reactor is designed to stratify as follows: The relatively heavy and relatively large solids tend to settle into a lower zone (bottom portion) of the reactor. The relatively fine or relatively lighter solids tend to float into the upper zone (at or near the top portion). The intermediate zone of the reactor preferably meets at least one of the following criteria:

the intermediate zone is (measurably) lower in TSS than at least the bottom zone and optionally also than in the upper zone;

the intermediate zone of the reactor is (measurably) lower in fine and/or light solids than the upper zone;

the intermediate zone of the reactor is (measurably) lower in coarse and/or fine solids than in the bottom zone. The terms 'heavy' and 'light' respectively 'fine' and 'coarse' are clear comparative terms with the context of this embodiment and the general disclosure of the present application.

The sludge treatment unit may be selected from devices known per se for use in the separation of a fluid comprising solids into a fraction reduced in solids content and a fraction enriched in solids content. The sludge treatment unit may in particular be selected from the group of cyclones, in particular hydrocyclones; screw presses; voraxial separators; drum screens; settlers; decanters; electro-dewatering devices; electro-osmosis devices; electro coagulation devices; and additional bioreactors operated at a lower total particulate solids content than the first bioreactor. Accordingly, the treatment in the sludge treatment device may in particular comprise a separation of the flow into a fraction reduced in solids content and a fraction enriched in solids content, selected from the group of cyclonic separation, in particular hydrocyclonic separation; screw pressing; voraxial separation; drum screen-separation; settling; decanting; electro-dewatering; electro-osmosis; electro coagulation; and conversion of organic substance in a bioreactor, in particular under anaerobic conditions, operated at a lower total particulate solids content than the first bioreactor. One or more of the sludge treatment units are preferably adapted to remove colloidal matter, in particular organic colloidal matter In an advantageous embodiment, a flocculation or coagulation additive is added to the second flow before feeding the flow to the sludge treatment unit or inside the sludge treatment unit, whereby organic substance in the flow flocculates or coagulates. In a further advantageous embodiment a flocculation or coagulation additive is added to the fourth flow, after which the fourth flow is preferably subjected to a step to remove coagulated/flocculated particles. Coagulation or flocculation additives and suitable conditions are known in the art per se. Examples of suitable coagulation/flocculation additives are inorganic metal salt coagulants, such as iron chloride; oxyde/hydroxide based coagulants, such as lime; and polymeric coagulants/flocculating agents, e.g. polyelectrolytes. Such treatment is in particular advantageous for reducing the content of soluble organic substance plus small particulate matter. Preferably, coagulation or flocculation is carried out whereby organic substance and colloidal organic substance having a size smaller than 20 μm flocculates or coagulated particles (coagulates or floccules) are formed having a size larger than 20 μm.

Further, use may be made of an adsorbant for removing organic matter, in particular colloidal matter. Examples thereof are activated carbon and adsorbant resins, e.g. ion exchange resins. The adsorbant to which the organic substance has adhered can then suitably be removed in a manner known per se, e.g. using a drum screen. Treatment with the adsorbant is in particular suitable for treating the fourth flow (obtained in sludge treatment unit 6) or the second flow.

The membrane filtration unit may be selected from membrane filtrators known in the art, such as those known in the art for treatment of fluids taken from anaerobic bioreactors wherein aqueous waste streams have been added. Usually the filtration membrane is a membrane for micro-filtration or a membrane for ultra-filtration. The pore-size may be chosen as desired. The lower limit for the pore size may, for instance, be as low as about 0.01 µm. Preferably the pore-size is in the range of 0.03-0.8 µm, in particular in the range of 0.1-0.5 µm. In particular, the membrane filtration unit may comprise a tubular filtration membrane, a (flat) sheet filtration membrane or a hollow-fibres filtration membrane. Suitable membranes are generally known in the art. Particularly suitable is a cross-flow membrane filtration unit. The cross-flow membrane filtration unit is usually operated at an average cross flow velocity of at least 0.2 m/sec. Preferably it is operated at an average cross flow velocity of 5 m/sec or less, in particular at an average cross flow velocity of 0.5 to 2.5 m/sec or less. The cross-flow is usually generated using a pump, a gas lift technique or a combination of the two. Advantageously, biogas is injected in a tubular filter membrane as a gas lift technique. This is advantageous to control the membrane fouling. Typically, the cross flow velocity is about 1 m/sec or less when using only a gas lift technique for generating cross flow.

The membrane filtration unit comprises an outlet for retentate. This outlet is typically part of a recycle loop, comprising a recycle conduit, for returning retentate to the bioreactor. A gas lift for facilitating the recycle stream can be provided in the recycle loop. The recycle loop may contain a short-cut conduit, for returning part of the retentate directly to the filtration unit, thereby bypassing the bioreactor.

In a specific embodiment, the membrane filtration unit comprises a membrane tank, in which the filter feed is introduced, the membrane tank comprising fluid that is to be filtered and flat sheet membranes or hollow fibres membranes, which are immersed in the fluid to be filtered. In this case, biogas is preferably used to scour the membranes during the filtration.

In a specific embodiment, the membrane filtration unit is immersed into the bioreactor. In this case the fourth flow is typically returned into the reactor.

In accordance with the invention, a part of the fluid taken from the bioreactor (the first flow) bypasses the sludge treatment unit and is used for the feed filtered in the membrane filtration unit. Thus, the first flow is characteristically used for the feed to be filtered in the membrane filtration unit without having been subjected to a pre-separation step wherein the TS content is (substantially) reduced by removal of solids. Usually, the first flow is fed directly into the filtration unit or the first flow is diluted with water or an aqueous liquid having a lower TS content than the first flow and then introduced into the filtration unit without having been subjected to a separation step wherein solids are removed from the flow.

Another part of the fluid taken from the bioreactor (the second flow) is subjected to a treatment in the sludge treatment unit.

One of the flows from the sludge treatment unit (fourth flow) is returned to the bioreactor or also used for the feed filtered in the membrane filtration unit.

Bypassing treatment in the sludge treatment unit in a part of the fluid flow taken from the bioreactor offers an advantage over subjecting all of the fluid taken from the bioreactor to a treatment in the sludge treatment unit, in particular in that good results can be achieved with a sludge treatment unit having a relatively low capacity (and thus a relatively small unit).

The water content of the fourth flow, as a weight percentage of the total weight of (a measured volume of) the flow, is generally high, compared to the water content of the fluid in the bioreactor and of the first flow. In principle, the fourth flow may be essentially free of at least particulate organic substances, or even be essentially free of any particulate matter, although the method can also be carried out whilst particulate matter, especially particulate organic substance, is still present in a significant concentration. Thus, the organic substance content in the fourth flow is generally lower than the average organic substance content in the reactor and the organic substance content in the first flow. In particular, the content of soluble organic substance and relatively small particles (such as colloidal particles) is also reduced. Herewith, the fourth flow can generally be used as dilution water when mixing it with the first flow, thereby forming the filter feed, or as dilution water for the fluid in the bioreactor. Thus, a method according to the invention can suitably be carried out without an external dilution water supply. It is contemplated that both uses of the fourth flow as dilution water can contribute to an advantage with respect to the membrane filtration. For instance, a reduction of the organic colloidal and soluble matter in the bioreactor with the fourth flow, in a method according to the invention will usually also have a desired effect on the content of organic soluble organic substance plus small particulate organic substance, in the first flow. Biomass concentration is maintained in the reactor by recycling part of the third flow, if necessary.

If desired, the fourth flow is subjected to an additional step to reduce colloidal content in the fourth flow, e.g. using a colloidal adsorbent onto which colloidals are adsorbed, or a step wherein the colloidal content is reduced with a coagulation or flocculation step into larger (non-colloidal) particles followed by a separation step. The use of a coagulant or flocculant in the fourth flow is in particular considered advantageous in an embodiment wherein (part of) the fourth flow is returned to the bioreactor. It is contemplated that any (excess) flocculant or coagulant brought into the bioreactor may help to reduce the colloidal content in the bioreactor. One may also subject the fourth flow to one or more other treatments, such as an electro-treatment or ozonation, which contribute to solubilisation of organic colloidal particles into dissolved organics.

The first and/or the second flow may advantageously be taken from a part of the reactor wherein the TSS content or the content of organic soluble substances and colloidal substances having a particle size less than 20 µm is relatively low, compared to the average content in the reactor.

The ratio of the first flow to second flow is usually chosen to provide a filter feed or fluid in the bioreactor with a desired content of total solids, a desired content of total suspended solids, a desired content of total particulate solids, a desired content of soluble plus particulate organic substance having a size of less than 20 µm, or a ratio of any of these parameters, as will be described in further detail, herein below.

The ratio of first flow to second flow (in volume/volume) is usually in the range of 1:2 to 50:1, in particular, at least 1:1, more in particular at least 4:1, e.g. about 7:3 or more. In a specific embodiment, the ratio is 19:1 or less. A preferred ratio depends on organic substance related parameters, such as TSS or total soluble and small particulate content (size <20 μm) in the first flow and the desired organic substance related parameters in the filter feed.

In a method of the invention, the second flow is advantageously separated into the third flow and fourth flow, thereby obtaining a fourth flow having a content of soluble plus colloidal organic substance having a size of less than 20 μm that is lower than the content of soluble plus colloidal organic substance having a size of less than 20 μm in the second flow. Said reduction may in particular be in the range of 0.1 to 90%, more in particular in the range of 0.1 to 30%. In a preferred embodiment, said reduction is at least 1%, in particular at least 5%.

This can in particular be achieved by subjecting the second flow to a coagulation/flocculation step and thereafter subjecting the flow to a size-based separation step, e.g. a filtration step, decantation, centrifugation, settling, treatment in a hydrocyclone.

It is also possible to subject the second flow to a separation step wherein water is separated from organic substance using electrodewatering, or electro coagulation.

The resultant fourth flow is particularly suitable to be used together with the first flow as the filter feed.

Usually, the content of soluble plus colloidal organic substance having a size of less than 20 μm of the fourth flow is less than 12 g COD/l, in particular 10 g COD/l or less, preferably 5 g COD/l or less, more preferably less than 3 g COD/l, in particular less than 1 g COD/l, more in particular less than 0.5 COD g/l. The fourth flow may be essentially free of organic substance. In practice, it may still contain some soluble plus particulate organic substance with a size of less than 20 μm, e.g. about 0.01 g COD/l or more, in particular about 0.1 g COD/l or more.

In an advantageous method, the total content of soluble organic substance plus organic particulate substance with a size less than 20 μm is reduced by at least 2 wt. %, preferably by at least 10 wt. %, in particular by 20-90 wt. % compared to the total average suspended solids content in the bioreactor.

The weight based concentration of total suspended solids (TSS) in the filter feed is usually between 5 and 50 g/l, with the proviso that the TSS content in the filter feed is usually less than the average TSS content in the bioreactor. Preferably, the TSS concentration in the filter feed is 35 g/l or less, more preferably 30 g/l or less, or 25 g/l or less. In particular for a side-stream membrane filter, the concentration is preferably between 15 and 25 g/l. For immersed membranes the concentration may advantageously be chosen in the range of 5-15 g/l.

The content of soluble plus colloidal organic substance having a size of less than 20 μm in the filter feed to the membrane filtration unit (filter feed, first flow plus optionally fourth flow or part thereof) is preferably less than 12 g COD/l, in particular less than 10 g COD/l, more in particular 5 g COD/l or less, more in particular 1 g COD/l or less. The lower limit is not particular critical. The content may for instance be about 0.1 g/l or more.

The ratio of the total content of soluble plus colloidal organic substance (g COD/l) with a size less than 20 μm in the filter feed to the total average suspended solids content in the bioreactor (g/l) is usually at maximum 0.40 g COD/g TSS, preferably 0.1-0.30 g COD/g TSS, in particular 0.5-0.15 COD/g TSS.

In a specific embodiment, the content of soluble plus particulate organic substance having a size less than 1.6 μm in the filter feed is relatively low, in particular its content is less than 9 g COD/l, preferably less than 4 g COD/l, in particular 0.9 g COD/l or less. It is considered that this fraction of the organic substance in particular contributes to undesired effects such as fouling of the filter membrane.

In an advantageous method the filter feed going to the membrane unit has a weight to weight ratio of soluble plus colloidal organic substance having a size of less than 20 μm—expressed as g COD/l to total suspended solids—expressed as g TSS/l—lower than 0.80 g COD/g TSS, in particular lower than 0.50 g COD/g TSS. This ratio is 0 or more; in practice this ratio usually is 0.001 or more, in particular 0.005 or more. For a side-stream filtration membrane it may in particular be advantageous to have said ratio to be lower than 0.50 g COD/g TSS or lower than 0.25 g COD/g TSS. For immersed membranes, it may be advantageous to have said ratio of 0.75 g COD/g TSS or lower than 0.5 g COD/g TSS.

A method according to the invention is suitably carried out in an installation according to the invention. FIG. 1 schematically shows such an installation. Standard items, such as pumps, valves, and the like, are not shown. The skilled person will be able to determine where these are needed or desired based on common general knowledge and the information disclosed herein.

The installation comprises a bioreactor (5); a sludge treatment unit (6) suitable for separating a fluid stream (second flow) from the bioreactor into a stream concentrated with respect to organics (third flow) and a stream comprising less organic substance (fourth flow) and a membrane filtration unit (7).

The bioreactor may be any type of bioreactors suitable for anaerobic treatment of aqueous waste streams. The bioreactor comprises at least one outlet (12, 12a, 12b) for a fluid stream (for the first and for the second flow). An outlet (11) for biogas is also typically present. In FIG. 1 an inlet (8, 8a) for a fluid waste stream is also shown. This inlet can be use or separate inlets can be provided for other streams, such as for the fourth flow from sludge treatment unit (6), retentate recycle from the membrane filtration unit (7). An outlet (11) for (bio)gas is also provided. The biogas may further be treated (e.g. burned, purified) in a manner known per se.

The sludge treatment unit (6) comprises an inlet (13) for fluid originating from the bioreactor (5), which inlet (13) is connected with the outlet for a fluid (12, 12a, 12b) of the bioreactor via a conduit (2) in a manner allowing for transporting fluid from the bioreactor (5) to the sludge treatment unit (6);

The sludge treatment unit (6)) comprises an outlet (14) for fourth flow, and an outlet (15) for third flow.

The membrane filter unit (7) comprises an inlet (16) for a fluid which inlet (16) is connected with the outlet (12, 12a) in a manner allowing for fluid from the bioreactor via a conduit (1) for transporting fluid from the bioreactor (5) to the filter unit (7).

The membrane filtration unit (7) comprises an outlet (18) for permeate and an outlet (17) for retentate, wherein the outlet (17) for retentate of the filtration unit (7) is connected to a recycle conduit (9) in a manner allowing for returning the retentate from filtration unit (7) to the bioreactor (5). If desired, a bypass (19) may be provided via which retentate may be returned directly to the filtration unit. All retentate may be returned to the reactor. However, it is also possible to provide the installation with a recycle for part of the retentate to the first flow/filter feed. Also, means may be provided to discard retentate.

In FIG. 1 the outlet (14) for the fourth flow of the sludge treatment unit is connected with a conduit (4, 4a) in a manner allowing for introducing the fourth flow, preferably after mixing with fluid taken from the bioreactor via the outlet for fluid (12, 12a), via inlet (16) as filter feed (FF) into the filtration unit. Optionally, the outlet (14) for the fourth flow of the sludge treatment unit is also connected with a conduit (4, 4b) in a manner allowing for recycling fourth flow to the bioreactor via the same inlet (8) or a separate inlet (8b) into the bioreactor.

The outlet (15) for third flow from the sludge treatment unit may be used to discard the third flow from the installation (3, 3b) or a recycle conduit (3a) can be provided to the bioreactor third flow. At least in the latter case, the bioreactor usually comprises an outlet to discard contents (surplus sludge) from the bioreactor, in order to prevent unacceptable accumulation of biomass, if needed. This outlet is not shown in FIG. 1.

Figure 2:
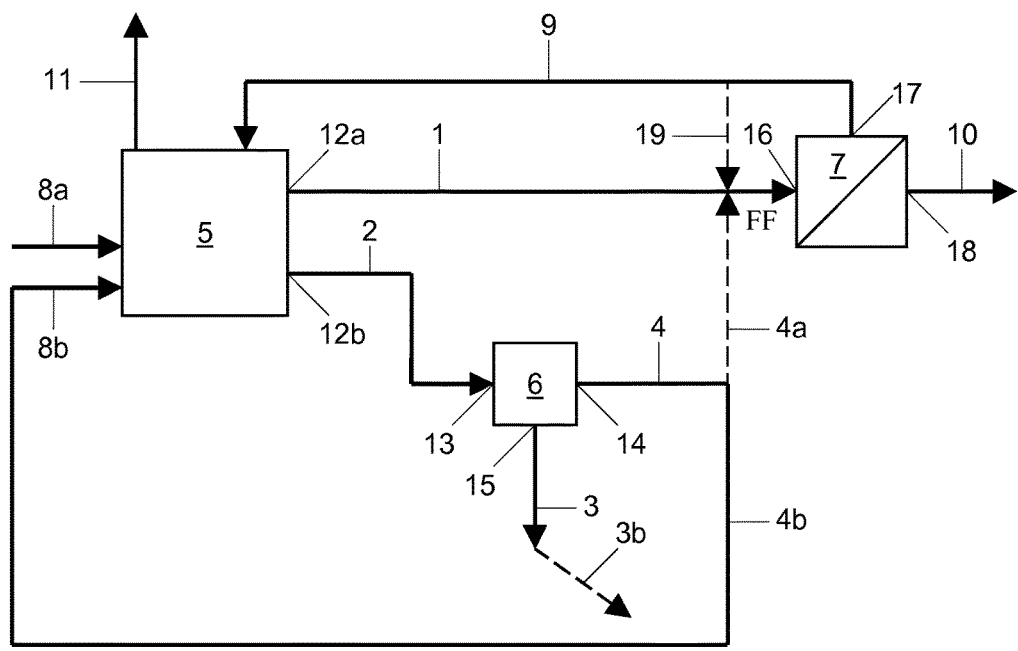
FIG. 2 is a schematic showing an alternative installation for carrying out the method of the invention wherein a fourth flow of a sludge treatment unit is recycled to the bioreactor.

FIG. 2 shows another installation of the invention. This installation corresponds largely to the installation shown in FIG. 1. In this embodiment, the outlet (14) for the fourth flow of the sludge treatment unit is connected with a conduit (4, 4b) in a manner allowing for recycling the fourth flow to the bioreactor via the same inlet as the waste stream (8) or a separate inlet (8b) into the bioreactor.

Figure 3:
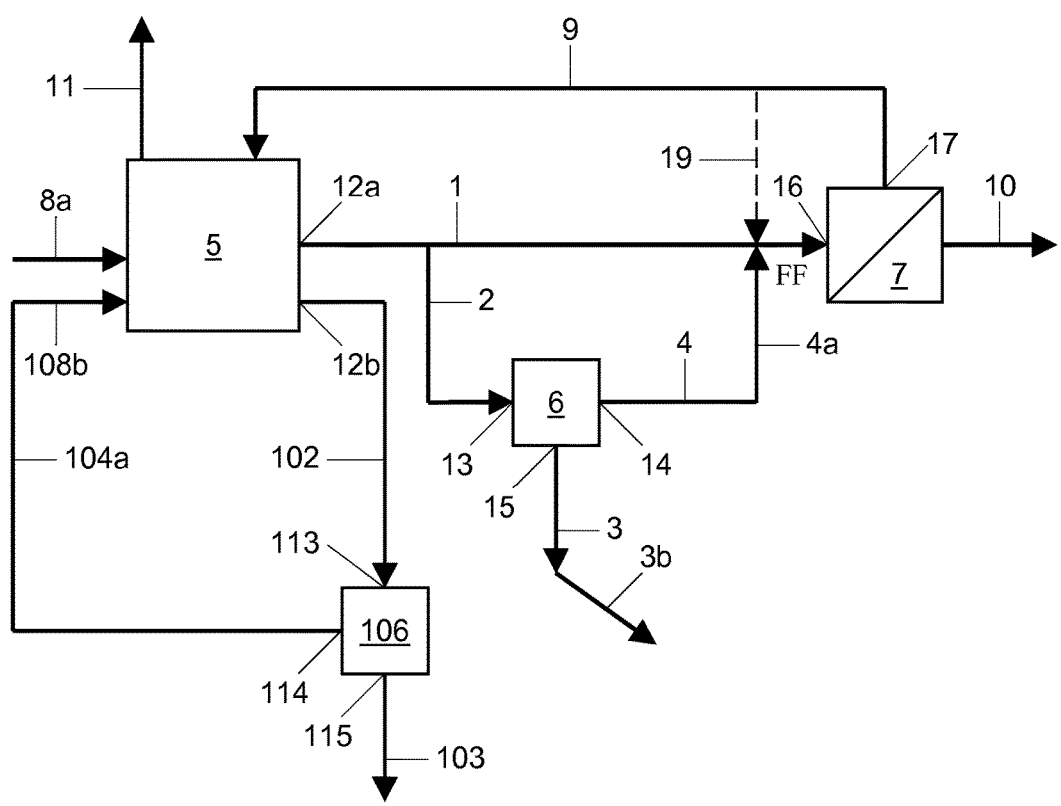
FIG. 3 is a schematic showing an installation that combines the features of the installations shown in FIG. 1 and FIG. 2.

FIG. 3 shows yet another installation of the invention.

The installation may further comprise additional treatment units (not shown) e.g. a unit for a coagulation/flocculation treatment, as described above. Such unit is advantageously provided in between the bioreactor (5) and the sludge treatment unit (6), adapted to allow adding of coagulation/floculationt agent to the second flow and further feeding the thus treated second flow to the sludge treatment unit, wherein the third flow and the fourth flow are formed.

In FIGS. 1 and 2, the sludge treatment unit is an external device, outside the bioreactor. It is also possible to use an installation wherein the sludge treatment unit is integrated in the bioreactor. In such embodiment, fluid of the bioreactor is subjected a separation step in a sludge treatment unit inside the bioreactor, wherein the fluid is separated into a third flow and a fourth flow, wherein the fourth flow has a decreased weight to weight ratio of soluble organic matter and small organic particles (particles having a size less than 20 μm) to total suspended solids compared to the fluid (second flow) introduced into the sludge treatment unit and wherein the fourth flow is used (completely or partly) to decrease the weight to weight ratio of soluble organic matter and small organic particles (particles having a size less than 20 μm) to total suspended solids of the first flow. The third flow (concentrated sludge) is usually discharged or returned to the bioreactor. The fourth flow typically has a reduced total suspended solids concentration, Also the colloidal and soluble (organic) content is generally reduced. The fourth flow is advantageously used completely or partly to decrease the total suspended solids concentration of the first flow. The remaining part is usually returned to the bioreactor. An example of sludge treatment unit that can be integrated in the bioreactor is a settler device.

FIG. 3 shows a combination of the embodiments of FIGS. 1 and 2, wherein '102' stands for a conduit for second flow to a sludge treatment unit 106 (cf. unit 6 in FIG. 2), '103' corresponds to the conduit 3 for third flow in FIGS. 2 and '104a' corresponds to the conduit 4 for fourth flow in FIG. 2. Items 108b and 113-115 correspond to items 8b and 13-15 in FIG. 2 respectively.

The invention will now be illustrated by the following Examples.

COMPARATIVE EXAMPLE

As a comparative experiment, a bioreactor was continuously fed with wheat thin stillage coming from a bioethanol plant. The bioreactor was a 10-L anaerobic digester. The reactor operated under mesophilic conditions (37° C.±0.5) and biogas was continuously produced. A first flow coming from the reactor was sent to a side-stream tubular cross flow ultrafiltration membrane. The cross-flow velocity was maintained constant and the membrane was operated in filtration/backwash mode. The membrane enabled the recovery of a clear effluent (the permeate) and the retentate was recycled to the reactor. Sludge (flow 2) was extracted daily to avoid excessive build-up of suspended solids in the reactor. The reactor was operated during 4 months in this configuration.

Example 1

A system was configured, based on FIG. 2, wherein the sludge treatment (unit 6) of the second flow comprised a coagulation/flocculation step thereby obtaining a flocculated sludge. This sludge was separated by a filter (0.300 mm) in a concentrated sludge (third flow) and a liquid flow (fourth flow). The fourth flow, having less total suspended solids and colloidal matter, as well as a lower organic substance content than the second flow, was returned into the reactor.

For this experiment, the same biological operating conditions as in the reference phase were used.

In both the Comparative Example and Example 1, standard characterisations and sludge filterability characteristics were checked. The results are presented in the following table

TABLE

Sludge filterability characteristics

| Parameter | Unit | Comparative Example | Example 1 | Reduction (%) |
|---|---|---|---|---|
| Critical flux | $L \cdot h^{-1} \cdot m^{-2}$ | 13 | 16 | |
| TSS | g/l | 28 ± 0.68 | 28.7 ± 1.9 | — |
| TCOD | g/l | 42 ± 3.5 | 41 ± 4.2 | — |
| CCOD | g/l | 9.1 ± 0.75 | 7.5 ± 0.7 | 17.6% |
| CCOD/TSS | gCOD/gTSS | 0.295 ± 0.013 | 0.255 ± 0.017 | 13.6% |
| SCOD | Mg/l | 3.2 ± 1.3 | 2.9 ± 0.6 | 9.4% |
| SCR | ($\times 10^{12}$ $m^{-1}$) | 3695 ± 430 | 2794 | 24.4% |
| CST | S | 4240 ± 598 | 3316 ± 294 | 21.8% |

TSS: Total Suspended Solids
TCOD: Total COD concentration (Chemical Oxygen Demand)
CCOD: Soluble & colloidal COD (Chemical Oxygen Demand)
SCOD: Soluble COD (Chemical Oxygen Demand)
SCR: Specific Cake Resistance measured under 0.5 bar (measured according to NFEN 14701-02)
CST: Capillary Suction Time measured with Triton Electronics Ltd type 304M The results show that the TSS concentration for both Example 1 and the Comparative Example were similar, but in Example 1 a lower colloidal organic content (CCOD) and a lower soluble organic (SCOD) concentration was achieved. The lower CCOD concentration had a direct influence on the sludge filterability characteristics and for Example 1 the following was observed:

a lower capillary suction time (this value correspond to the time needed by the liquid fraction to diffuse and progress a distance of 1 cm in a filter): the liquid fraction diffuses more easily in the membrane during the first experiment than in the comparative example.

A lower specific cake resistance value (this value corresponds to the cake resistance formed during the filtration); it is therefore easier to filtrate through the cake which is formed during filtration The same membrane piece was used for both the Comparative Example and Example 1 during the continuous operation. However, to compare the membrane performances in both cases without having some influence of the membrane history, critical flux measurements were performed with new membranes pieces. The critical flux measurement enabled the determination of the optimal flux at which the membrane can be operated: the flux is increased stepwise until an unstable transmembrane pressure (high fouling behaviour) was observed. The results showed that during the Comparative Example, an operating flux of ca. 13 L/h/m2 could be maintained whereas, an operating flux of 16 L/h/m2 could be maintained for Example 1. This clearly demonstrates that in a method according to the invention better filtration performances are achieved, and that less membrane surface and energy are required for the reactor operation.

Example 2

Example 2 is used to illustrate a technical effect of an embodiment based on FIG. 1, i.e. an embodiment wherein the fourth flow is fed to the filtration unit. The same sludge treatment as in Example 1 was used.

Sludge (cf. second flow) was taken from an AnMBR pilot plant. A liquid with reduced organic substance content (cf. fourth flow) was produced from this sludge (as in Example 1) and the liquid was then mixed with untreated sludge (cf. first flow) according to a defined ratio and fed into the filter (filter feed). The filterability properties of this mixture were then determined and compared to the initial sludge (from the bioreactor).

The filterability characteristics were determined for the untreated sludge from the bioreactor and for the mixture (84% sludge from the bioreactor+16% fourth flow). The results are presented in the following table.

TABLE filterability characteristics of the sludge and of the mixture
(84% sludge (second flow) + 16% fourth flow)

|  | Sludge | Mixture (84% sludge + 16% fourth flow) | Reduction by addition of fourth flow |
|---|---|---|---|
| Critical flux | 12 | 14 |  |
| TSS (g/L) | 27.0 | 23.3 | 13.7% |
| VSS (g/L) | 24.8 | 21.1 | 14.9% |
| TCOD (g/L) | 43.8 | 35.8 | 18.2% |
| CCOD (g/L) | 8.7 | 5.8 | 33.6% |
| CCOD/TSS (g/g) | 0.321 | 0.247 | 23.1% |
| SCOD (g/L) | 3.9 | 2.5 | 36.2% |
| CST (s) | 3890 | 2687 | 30.9% |

The results clearly illustrate that mixing sludge from the bioreactor with a fourth flow leads to a reduction of the TSS and colloidal COD in the mixture. As a result of this reduction, a CST reduction of 30.9% was achieved, illustrating that the mixture will be easier to filtrate.

Critical flux measurements were then performed with the untreated sludge from the bioreactor and the mixture of sludge with fourth flow. The critical flux measurements were performed with the same membrane after cleaning. The results showed that the critical flux measurement was better for the mixture of the sludge and fourth flow (14 $L \cdot h^{-1} \cdot m^{-2}$ instead of 12 $L \cdot h^{-1} \cdot m^{-2}$).

These results confirm that it is beneficial to mix the sludge from the bioreactor with an aqueous liquid having reduced organics content obtained in accordance with the invention, before the filtration membrane to achieve better membrane performance.

The invention claimed is:

1. Method for treating a fluid aqueous waste stream comprising a biodegradable organic substance, comprising
feeding the aqueous waste stream into a bioreactor containing a fluid which contains biomass;
reacting the biodegradable organic substance with the biomass in the bioreactor under essentially anaerobic conditions, thereby forming methane;
taking a first flow of fluid from the bioreactor and using the first flow for a feed to a membrane filtration unit, in which said feed is subjected to filtration, thereby forming a permeate stream and a retentate stream;
returning the retentate stream completely or partly to the bioreactor;
taking a second flow of fluid from the bioreactor as feed to a sludge treatment unit, which sludge treatment unit may be positioned outside the bioreactor or integrated in the bioreactor;
adding a flocculation or coagulation additive to the second flow before feeding the second flow to the sludge treatment unit or adding a flocculation or coagulation additive inside the sludge treatment unit, whereby organic substance in the flow flocculates or coagulates;
separating the second flow of fluid in the sludge treatment into a third flow, having a higher organic substance content than the second flow, and a fourth flow, having a lower organic substance content than the second flow; and
mixing the fourth flow completely or a part thereof with the first flow that is to be fed to the membrane filtration unit and feeding said mixture into the membrane filtration unit.

2. Installation suitable for carrying out a method according to claim 1, comprising a bioreactor (5); a sludge treatment unit (6) suitable for separating a second flow fluid stream from the bioreactor into a third flow having a higher organic substance content than the fluid stream from the bioreactor and a fourth flow having a lower organic substance content than the fluid stream from the bioreactor, and a membrane filtration unit (7),
the bioreactor (5) comprising an inlet (8, 8a) for a fluid waste stream, an outlet (12, 12a, 12b) for a first flow and second flow and an outlet (11) for a gas;
the sludge treatment unit (6) comprising an inlet (13) for fluid originating from the bioreactor (5), which inlet (13) is connected with the outlet for a fluid (12, 12a, 12b) of the bioreactor via a conduit (2) for transporting fluid from the bioreactor (5) to the sludge treatment unit (6);
the sludge treatment unit (6) comprising an outlet (14) for said fourth flow, and an outlet (15) for said third flow;
the installation further comprising a unit for a coagulation/flocculation treatment provided in between the bioreactor (5) and the sludge treatment unit (6), adapted to allow adding coagulation/flocculation agent to the second flow originating from the bioreactor and further feeding the thus treated second flow to the sludge treatment unit;

the membrane filter unit (7) comprising at an inlet (16) for a fluid which inlet (16) is connected with the outlet (12, 12a) for fluid from the bioreactor via a conduit (1) for transporting fluid from the bioreactor (5) to the filter unit (7);

the membrane filtration unit (7) comprising an outlet (18) for permeate and an outlet (17) for retentate, wherein the outlet (17) for retentate of the filtration unit (7) is connected to a recycle conduit (9) for returning the retentate from filtration unit (7) to the bioreactor (5);

which outlet (14) for said fourth flow is connected with a conduit (4, 4a) for introducing the fourth flow, after mixing with fluid taken from the bioreactor via the outlet for fluid (12, 12a), via inlet (16) as filter feed (FF) into the filtration unit and/or which outlet (14) for the fourth is connected with a conduit (4, 4b) for recycling fourth flow, to the bioreactor via the same inlet (8) or a separate inlet (8b) into the bioreactor.

3. Installation according to claim 2, wherein the installation is provided with a sludge outlet (3b, 103) to extract sludge from the installation.

4. Method for treating a fluid aqueous waste stream comprising a biodegradable organic substance, comprising
feeding the aqueous waste stream into a bioreactor containing a fluid which contains biomass;
reacting the biodegradable organic substance with the biomass in the bioreactor under essentially anaerobic conditions, thereby forming methane;
taking a first flow of fluid from the bioreactor and using the first flow for a feed to a membrane filtration unit, in which said feed is subjected to filtration, thereby forming a permeate stream and a retentate stream;
returning the retentate stream completely or partly to the bioreactor;
taking a second flow of fluid from the bioreactor as feed to a sludge treatment unit, which sludge treatment unit may be positioned outside the bioreactor or integrated in the bioreactor,
adding a flocculation or coagulation additive to the second flow before feeding the second flow to the sludge treatment unit or adding a flocculation or coagulation additive inside the sludge treatment unit, whereby organic substance in the flow flocculates or coagulates,
separating the second flow of fluid in the sludge treatment into a third flow, having a higher organic substance content than the second flow, and a fourth flow, having a lower organic substance content than the second flow; and
feeding the fourth flow completely or partly to the bioreactor.

5. Method according to claim 4, wherein the fourth flow has a content of soluble plus colloidal organic substance having a size of less than 20 µm that is lower than the content of soluble plus particulate organic substance having a size of less than 20 µm in the second flow.

6. Method according to claim 4, wherein the content of soluble plus colloidal organic substance having a size of less than 20 µm of the fourth flow is less than 10 g with COD/l.

7. Method according to claim 4, wherein the content of soluble plus colloidal organic substance having a size of less than 20 µm in the feed to the membrane filtration unit is less than 12 g COD/l.

8. Method according to claim 4, wherein the content of soluble plus colloidal organic substance having a size of less than 1.6 µm in the filter feed is less than 9 g COD/l.

9. Method according to claim 4, wherein the sludge treatment unit comprises one or more devices selected from the group consisting of cyclones; screw presses; Voraxial® separators; drum screens; settlers; decanters; electro-dewatering devices; electro-osmosis devices; electro coagulation devices; and additional bioreactors operated at a lower total particulate solids content than the first bioreactor.

10. Method according to claim 4, wherein soluble organic substance and colloidal organic substance having a size smaller than 20 µm flocculates or coagulates to form coagulates or flocculates having a size larger than 20 µm which coagulates or flocculates are removed with a separation device.

11. Method according to claim 4, wherein a flocculation or coagulation additive is added to the fourth flow whereby organic substance in the flow flocculates or coagulates, wherein soluble organic substance and colloidal organic substance having a size smaller than 20 µm flocculates or coagulates to form coagulates or flocculates having a size larger than 20 µm which coagulates or flocculates are removed with a separation device.

12. Method according to claim 4, wherein the second flow or the fourth flow is subjected to an adsorption treatment, wherein organic substance, in particular soluble and/or colloidal organic substance having a size of less than 20 µm is adsorbed to an adsorbent, which is subsequently separated from the flow.

13. Method according to claim 4, wherein the weight based concentration of total suspended solids in the feed to the membrane filtration unit is between 5 and 50 g/l.

14. The method of claim 13, wherein the weight based concentration of total suspended solids in the feed to the membrane filtration unit for side-stream membranes is between 10 and 35 g/l, and for immersed membranes is between 5 and 15 g/l.

15. Method according to claim 4, wherein the feed to the membrane filtration unit has a weight to weight ratio of soluble plus colloidal organic substance having a size of less than 20 µm which is expressed as g COD/l to total suspended solids which is expressed as g TSS/l lower than 0.8.

16. The method of claim 15 wherein the feed to the membrane filtration unit has a weight to weight ratio of soluble plus colloidal organic substance having a size of less than 20 µm to total suspended solids is lower than 0.25 for side-stream membranes and is lower than 0.5 for immersed membranes.

17. Method according to claim 4, wherein the total suspended solids content in the feed to the membrane filtration unit is reduced by at least 2 wt. %, compared to the total average suspended solids content in the bioreactor.

18. Method according to claim 4, wherein the ratio of total content of soluble plus colloidal organic substance having a size less than 20 µm in the feed to the membrane filtration unit—expressed as g COD—to the total average suspended solids content in the bioreactor is 0.4 or less.

19. Method according to claim 4, wherein the bioreactor is a mixed reactor, which mixed reactor is a reactor with stratified fluid zones, including an upper, intermediate and lower zone.

20. Method according to claim 4, wherein the membrane filtration unit is a cross-flow membrane filtration unit, which is operated at an average cross flow velocity of 5 m/sec or less.

21. The method of claim 4 wherein said fourth flow is completely or partly mixed with the first flow that is to be fed to the membrane filtration unit and said mixture is fed into the membrane filtration unit.

* * * * *